March 22, 1949.  B. F. BREGI ET AL  2,464,963
GEARING
Filed Aug. 5, 1946  3 Sheets-Sheet 1
FIG.5.
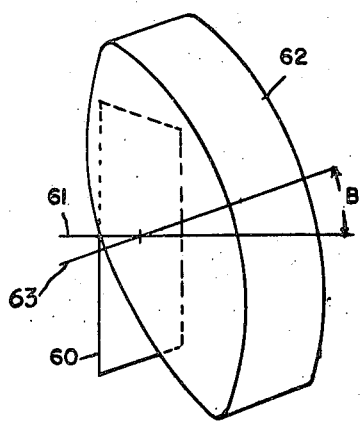
FIG.I.
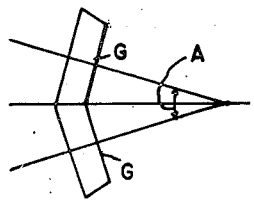
FIG.4.
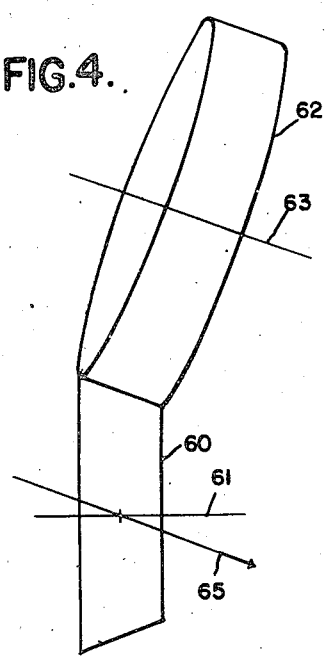
FIG.6.
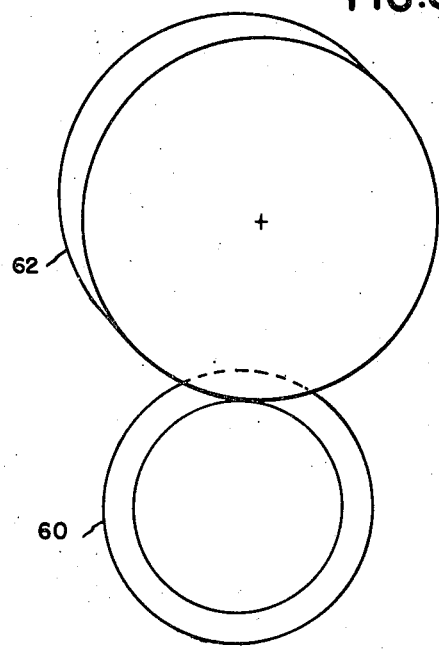
*INVENTORS*
BENJAMIN F. BREGI
BY VICTOR E. FRANCIS
*Whittemore, Hulbert*
*& Belknap*
ATTORNEYS

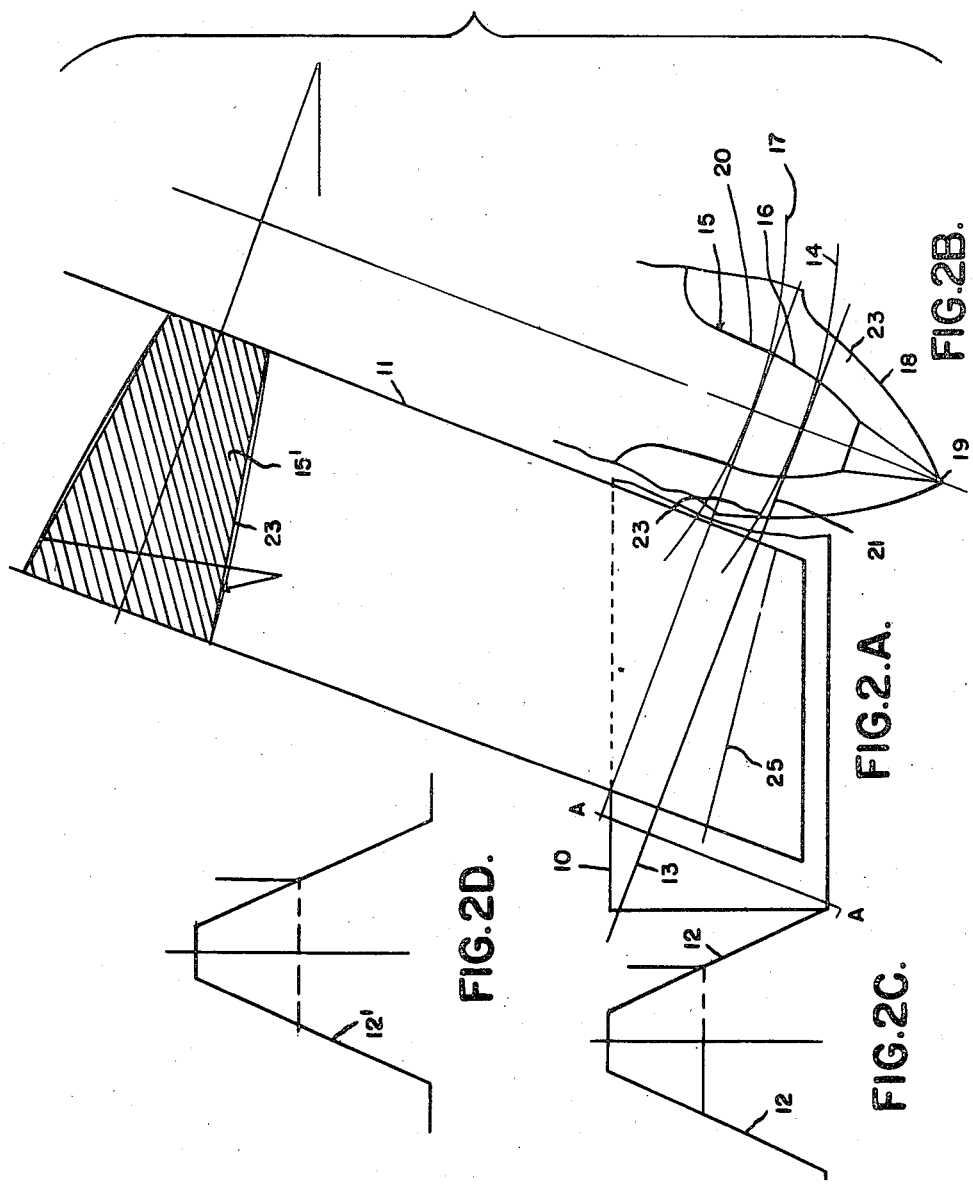

March 22, 1949.  B. F. BREGI ET AL  2,464,963
GEARING
Filed Aug. 5, 1946  3 Sheets-Sheet 3

INVENTORS
BENJAMIN F. BREGI.
VICTOR E. FRANCIS
BY Whittemore, Hulbert
& Belknap
ATTORNEYS Patented Mar. 22, 1949

2,464,963

UNITED STATES PATENT OFFICE 2,464,963

GEARING

Benjamin F. Bregi and Victor E. Francis, Detroit, Mich., assignors to National Broach & Machine Company, Detroit, Mich., a corporation of Michigan Application August 5, 1946, Serial No. 688,454

7 Claims. (Cl. 74—459.5)

The present invention relates to gearing and more particularly to tooth members having a generally conical shape, the gears having cone angles of at least 1° and adapted to run in mesh with their axes intersecting at an angle equal to the sum of their cone angles, or nonintersecting and non-parallel.

At the outset it is to be noted that this type of gearing which we term conical gearing is to be sharply distinguished from conventional bevel gearing of the type now known to the art and widely used in industry.

Conical gearing of the type disclosed herein operates in mesh with the axes of a pair of conical gears either intersecting or non-parallel and nonintersecting and is applicable for providing a driving connection between shafts having any angle up to 90° therebetween.

It is an object of the present invention to provide conical gears having teeth whose operating surfaces are substantially generated involute helicoids. It is a further object of the present invention to provide conical gearing having teeth which may be checked in conventional apparatus for involute and lead. It is a further object of the present invention to provide gearing for interconnecting shafting characterized by the lack of sensitivity of the gearing against displacement and more particularly axial and angular displacement. It is a further object of the present invention to provide conical gearing for interconnecting shafting characterized by interchangeability of the gear members. It is a further object of the present invention to produce conical gearing for interconnecting non-parallel shafts which is much quieter in operation than known gearing.

Other objects and features of the invention will become apparent as the description proceeds, especially when taken in conjunction with the accompanying drawings, wherein:

Figure 1 is a diagrammatic view illustrating a pair of meshing gears of the type forming the subject matter of the present invention;

Figure 2 is a diagrammatic showing adapted to afford an understanding of the tooth shape of gearing forming the subject matter of the present invention in which the teeth are straight; and in this figure, Figure 2A indicates a basic horizontal rack and meshing spur conical gear; Figure 2B is an end elevation of a gear tooth; Figure 2C is an end elevation of a rack tooth; and Figure 2D shows the effective profile or pressure angle of the rack tooth as viewed perpendicular to the plane of rotation of the gear, or a section A—A;

Figure 3 is a diagrammatic showing adapted to afford an understanding of the tooth shape of gearing forming the subject matter of the present invention in which the teeth are spiral; and in this figure, Figure 3A indicates a basic horizontal rack and meshing conical gear having spiral teeth; Figure 3B is an end elevation of a spiral gear tooth; Figure 3C is a fragmentary end elevation of a section of the basic rack; Figure 3D is a fragmentary section of the rack taken along the line A—A, showing the different effective pressure angles at opposite sides thereof; and Figure 3E is a plan view of a section of rack, illustrating the inclination of the teeth;

Figure 4 is a diagrammatic front elevation view illustrating meshing relationship between a conical gear of the type disclosed herein with a cylindrical shaving cutter;

Figure 5 is a plan view of the diagrammatic showing of Figure 4; and

Figure 6 is a side elevation view of the diagrammatic showing of Figure 4.

Figures 3, 3A, 3B, 3C, 3D, 3E:
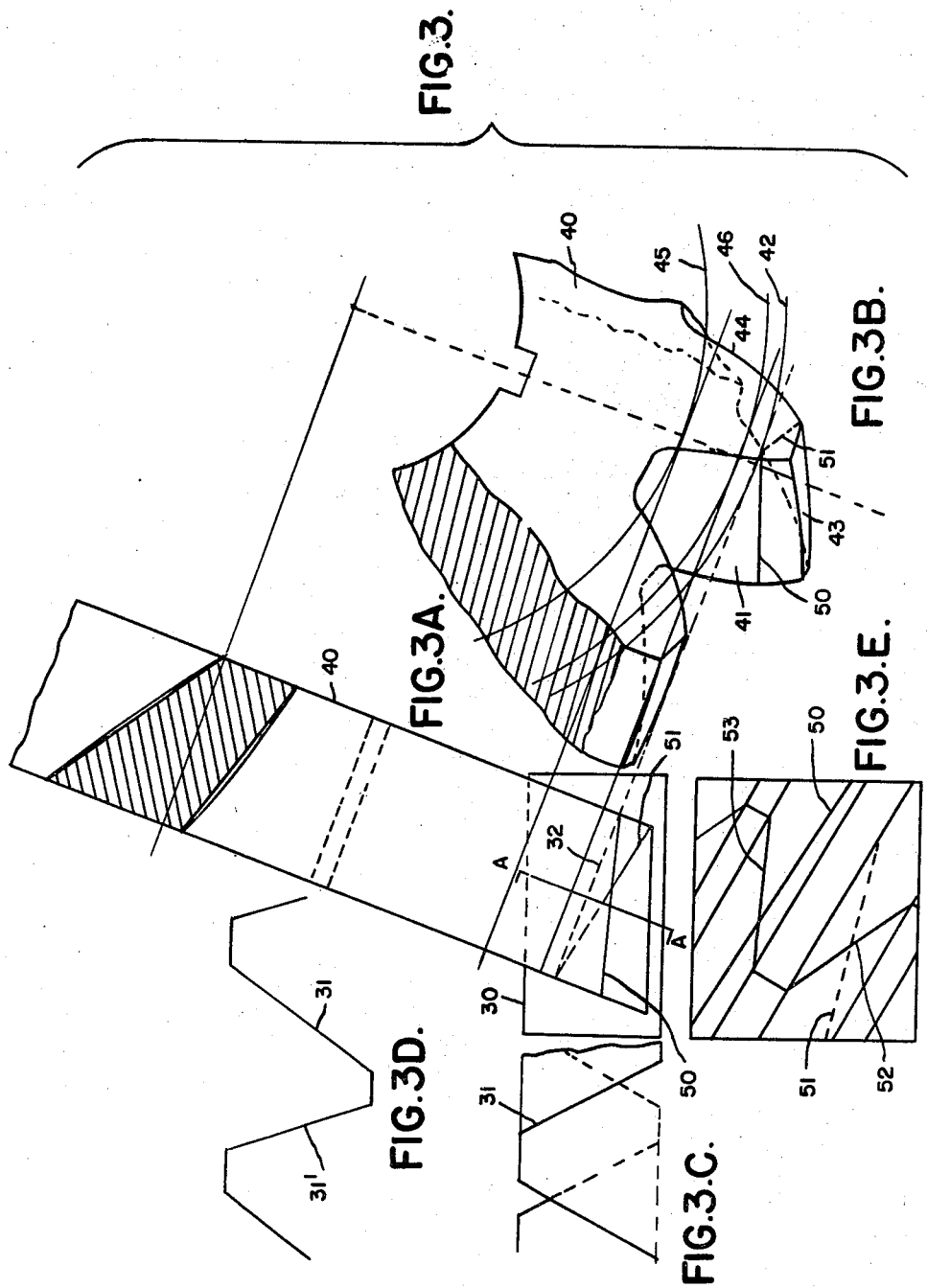

According to the present invention conical gears are produced by a method of manufacture which includes the initial step of roughing teeth on a conical blank by any process equivalent to generating tooth surfaces from a straight rack. Conveniently, this step may be performed by hobbing, with the conical blank inclined transversely to the travel of the hob at an angle equal to the pitch cone angle thereof. It will be appreciated that this hobbing process results in the formation of a toothed member the teeth of which are conjugate to an ordinary rack. The tooth surfaces are generated by the sides of the hob teeth and the opposite sides of the teeth are true involutes of the same or different base circles, depending on whether the teeth are straight or spiral, as measured in the plane of rotation.

Due to its generated method of formation the sides of the teeth on the conical gear will have a true lead or helix angle as measured along a path at a constant radial distance from the axis.

As a result of tooth formation as described above, it is possible to check the involute and lead of the teeth in ordinary gear checking apparatus and accordingly gears may be mass produced which are substantially identical and hence interchangeable. This desirable circumstance avoids the necessity of furnishing such gears to the users only in mating pairs.

Inasmuch as the conical gears produced as described above are conjugate to a straight rack and have a pitch cylinder as contrasted to a pitch cone, it will be apparent that such gears would run in mesh with the large end of one gear matched with the small end of a conjugate gear and with the axes of the gears parallel. However, these gears will also run in proper mesh when the large ends thereof are matched, in which case their axes intersect at an angle equal to the sum of cone angles of the gears. In this case, however, the instantaneous contact between the teeth of the conical gears is of a limited area which is determined by the angle of the intersection of the straight line elements along which teeth would contact the conjugate rack system. Inasmuch as these lines cross on mating tooth surfaces of conical gears, theoretical point contact is developed and clearance exists toward either end of the teeth away from the theoretical point of contact.

Figure 1 shows a pair of conical gears G operating in mesh with their axes intersecting at the angle A. In this figure conical gears G are shown as identical, but gears made in accordance with the present invention are interchangeable so that gears of different cone angles may be operated together, or they may be meshed with their axes nonintersecting in the manner of hyperboloidal gearing.

One of the most important advantages of gearing made in accordance with the present invention is flexibility of design. A conical gear conjugate to a given basic rack will mesh with any other conical gear having the same basic rack characteristics. Therefore, the gears of a set made in accordance with the present invention may have different numbers of teeth so as to provide any desired ratio, without respect to the cone angles of the gears. Thus it is possible to design a matching pair of conical gears in which the cone angle need not be a function of the number of teeth. In this figure the gears G are shown as disposed with their axes intersecting at an angle equal to the sum of the cone angles of the gears. However, by a proper selection of spiral angles, such gears could have their axes nonintersecting and occupying planes which intersect at an angle which is a function of the cone angles and still operate satisfactorily.

Referring now to Figure 2, there is illustrated in Figure 2A at 10 a basic rack and at 11 the contour of a conical gear in mesh therewith. It will be appreciated that the sides 12 (Figure 2C) of the teeth of the rack 10 are plane surfaces and accordingly when a conical gear is rolled in mesh with the rack it will roll in a straight line along the rack and establish a pitch plane 13 on the rack and a pitch cylinder 14 on the conical gear. It will further be appreciated that an effect of inclining the axis of the gear blank to the plane of the rack is to vary its pressure angle, the inclination of the axis of the cone giving rise to a decrease in pressure angle, as illustrated in Figure 2D where 12' indicates a decreased pressure angle represented by a section along the line A—A, Figure 2A. Inasmuch as all elements of the surface of the rack tooth 12 are straight line elements, and therefore the elements contained in any plane of rotation of the gear are straight line elements, it will further be appreciated that the teeth of the conical gear which are conjugate thereto are therefore involute in planes perpendicular to the axis. It will also be appreciated that another effect of inclining the gear blank to the plane of the rack is to introduce changes in helix angle at opposite sides of the gear teeth, the changes being of opposite sense at opposite sides of the teeth.

In Figure 2B the tooth 15 of the conical gear is illustrated as having curves 16 at the small end thereof which are involutes from the base cylinder 17 and as having curves 18 at the large end thereof which are also involutes from the same base cylinder. In this diagrammatic illustration the width of the conical gear is such that the teeth at the large end of the gear actually become pointed as indicated at 19. This figure intends merely to illustrate the general form of the gear teeth and it will be appreciated that in practice the gear will be of substantially less width with proper design so that pointed teeth are avoided. Furthermore, for purpose of illustration the teeth at the small end of the gear are illustrated as substantially undercut below the base cylinder as indicated at 20 whereas in actual practice the teeth will be cut to such a depth that little if any undercutting will appear.

At the top of Figure 2A at 15' is shown a section of a tooth 15 taken at the pitch cylinder and in this case it will be observed that along this section the tooth is of continuously greater thickness progressively toward the large end of the gear. The lines or curves 23 of the tooth 15 are actually helical, even in a so-called straight tooth conical gear, when measured along a path at constant radial distance from the axis thereof.

It will be appreciated that instantaneous contact between the tooth 15 and a surface of the rack tooth 12 is along straight line elements 25. It will further be appreciated that a lead check taken at a constant radial distance from the axis will follow along the curved helical path such as designated 23, which is the trace of the pitch cylinder 14 on the tooth surface, which will prove to be a true helix if checked by conventional lead checking equipment.

Referring now to Figure 3, which is similar to Figure 2 except that it illustrates a conical gear having spiral teeth, we have illustrated at 30 in Figure 3A a section of a rack with which the gear 40 is conjugate. Since the gear 40 has spiral teeth its interaction with a basic rack 30 gives rise to different operating pressure angles at opposite sides of the teeth as indicated at 31' in Figure 3D. The lines 31' are developed from a section taken along the line A—A, parallel to the path along which the gear rolls. The pitch cylinder of the gear has been designated 42 and its tangent has been projected to indicate the pitch plane 32 of the rack as seen in Figure 3A. The teeth 43 of the gear 40 have opposite sides 41 and 44 which are involutes of different base cylinders 46 and 45, respectively.

At 50 there is designated an instantaneous line contact between the side of the tooth 41 and surface of the rack. The corresponding instantaneous contact at the other side of the tooth 44 between the surface of the tooth and the surface of the rack is designated 51.

Figure 3E is a plan view of a portion of the basic rack, on which the lines 52 and 53 have been superimposed to indicate that the slope or pressure angle of opposite sides of the rack teeth are equal. These superimposed lines represent the normal basic rack of the gear. The different effective or operating or generating pressure angles indicated by lines 31' are the result of operating along a pitch plane of the rack which is inclined to the plane thereof.

As previously stated, a pair of gears produced in accordance with the method outlined above and having the shapes and characteristics described will operate with their axes intersecting or nonintersecting and non-parallel but will have a limited area of contact and this area of contact will be located substantially midway between the ends of both meshing teeth on properly designed conical gears. In order to broaden the area of contact without at the same time sacrificing the advantages previously outlined, a modification is applied to the gear teeth. This modification may be applied by a shaving operation performed on the teeth of the conical gear by operating it at crossed axes with a cylindrical gear shaving cutter and providing a relative reciprocation in order to distribute the finishing action of the shaving cutter over the surface of the teeth of the conical gear.

Referring now to Figures 4 to 6, we have illustrated at 60 a conical gear having an axis 61 in mesh with a cylindrical shaving cutter 62, the axis of which is designated 63. It will be observed that the axis 63 is inclined to the axis 61 at an angle substantially equal to the cone angle. In addition, the teeth of the cutter 62 are of such a helix that the cutter 62 meshes with the conical gear 60 when it is in a skew relationship thereto as indicated by the angle B seen in Figure 5. It will be appreciated that this skew relationship between the cylindrical cutter 62 and the conical gear 60 is the equivalent of the relationship between a pair of cylindrical gear-like members, which is known to the art as a crossed axes relationship.

The teeth of the cutter 62 (which have not been indicated in Figures 4 to 6) are provided with serrations or grooves forming intermediate ribs which have cutting edges at the tops thereof. The conical gear 60 and the shaving cutter 62 are rotated in mesh and a relative translation therebetween is introduced in a plane indicated by line 65 in Figure 4, which plane is parallel to axis 63 and perpendicular to the plane of rotation of cutter 62.

The meshing relationship between a pair of cylindrical gear-like members at crossed axes is well understood and results in theoretical point contact between surfaces of the mating teeth due to the crossed axes relationship. In the case of a cylindrical gear-like member meshing with conjugate teeth on a conical gear member there exists an instantaneous theoretical point contact even though the axes of the cylindrical gear-like member and the conical gear are coplanar and intersecting. In the present set-up, the axes of the conical gear and the cylindrical cutter are not coplanar but instead are in skewed relationship by an amount indicated by the angle B in Figure 5, and it will be observed that the center about which this relative skewing has taken place is located centrally between the end faces of the conical gear 60 and also between end faces of the cylindrical cutter 62. Relative translation referred to results in spreading the finishing action of the cutter 62 longitudinally of the teeth of the conical gear 60. This action is not uniform, however, since a theoretical mating condition is possible only with contact at the mid portion of the teeth of the conical gear. Accordingly, reciprocation results in imparting a finishing action to the tooth surfaces of the conical gear and at the same time more stock is removed from adjacent the center of the teeth of the conical gear with the result that what may be termed a hollow lead is produced. The amount of the hollow produced may be predetermined. We have termed this increased stock removal adjacent the centers of the teeth as hollow lead modification.

It will be evident that a pair of gears which have thus been shaved so as to produce teeth having hollow leads will have the area of contact substantially increased and this area of contact may be increased any amount desired by predetermining the amount of stock removal. In practice, however, the amount of stock removal is such that tooth contact remains over a central area of the teeth and end contact is avoided. Among other advantages, this produces exceptionally quiet running gears and greater load carrying capacity.

Reference was previously made to hobbing as a possible method of roughing the conical gear teeth. Such teeth could be generated by a gear shaper in an obviously equivalent manner.

While at present we prefer to finish these gears by shaving as previously described, it is recognized that the final modified contour described could be obtained in the initial generation. Thus in hobbing or shaper cutting, a relative motion between the cutter and gear can be superimposed on the generating motion which would have the effect of removing more stock at mid portions of the teeth than at the ends thereof.

Gears produced in accordance with the present invention are very much less sensitive to displacement and in fact very substantial displacement is permitted without producing undesirable end contact between the teeth.

It has been found that gears made in accordance with the present invention operate satisfactorily to transmit heavy loads without failure and one of their most desirable operating characteristics is their extreme quietness in operation.

While the conical gear having spiral teeth illustrated in Figure 3 is shown as having involutes of different base circles on opposite sides of the teeth thereof, it will be appreciated that involutes of the same base circles could be provided on opposite sides of the teeth by employing a tool such as a hob in which the pressure angle on opposite sides of the tool teeth differs such that the operating pressure angle during the generating operation is the same on both sides of the teeth.

While it is theoretically possible to practice the present invention on cone gearing adapted to interconnect shafts having a relatively large included angle, we prefer as a practical matter to limit the invention to gearing adapted to interconnect shafts having an angle therebetween up to 90°.

The invention has been illustrated in conjunction with external gears, but it will be appreciated that the concept is broadly applicable to internal gears as well, and that mating internal-external gear pairs may be produced as outlined above. Accordingly the claims are intended to cover both internal and external conical gears.

What we claim as our invention is:

1. A conical gear provided with teeth having substantially identical involute profiles as measured in planes perpendicular to the axis of said gear and having substantially uniform helix angles from end to end as measured along a path at constant radial distance from the axis of said gear, said teeth being modified by having hollow lead modification at their mid portions to increase the area of contact.

2. A pair of conical gears adapted to mate with corresponding ends in contact, each of which is generally conjugate to a straight rack but modified from such theoretical conjugate form by having their teeth relieved with a hollow lead modification at the mid portions to increase area of contact.

3. A pair of conical gears adapted to mate with corresponding ends in contact, each of which is generally conjugate to a straight rack but modified from such theoretical conjugate form by having their teeth relieved at the mid portions to increase area of contact, the relief being less than sufficient to produce contact at either end of the teeth.

4. A pair of conical gears adapted to mate with corresponding ends in contact, each of which is generally conjugate to a straight rack but modified from such theoretical conjugate form by having their teeth relieved at the mid portions to increase area of contact, the relief being less than sufficient to produce contact at either end of the teeth, said relief being a hollow lead modification.

5. A conical gear adapted to mesh with a similar conical gear with the axes of said gears disposed in planes intersecting at an angle which is a function of the cone angles of said gears, said gear being characterized by having teeth whose profiles are involute of the same base circle throughout, which involutes can be checked in planes perpendicular to the axis of said gear and which have substantially uniform helix angles from end to end, which helix angle can be checked along a path at constant radial distance from the axis of said gear, the teeth of said gear being provided with hollow lead modifications adjacent their mid portions to increase area of contact.

6. A conical gear having spiral teeth whose working surfaces are substantially generated involute helicoids, the surfaces on opposite sides of the teeth being involute of different base cylinders.

7. A conical gear having teeth whose working surfaces are substantially generated involute helicoids, but modified therefrom to have hollow lead relief to provide increased area of contact.

BENJAMIN F. BREGI.
VICTOR E. FRANCIS.

REFERENCES CITED

The following references are of record in the file of this patent:

UNITED STATES PATENTS

| Number | Name | Date |
| --- | --- | --- |
| 1,680,258 | Schurr | Aug. 7, 1928 |
| 1,687,150 | Taylor | Oct. 9, 1928 |
| 1,755,102 | Croft | Apr. 15, 1930 |
| 2,028,786 | Lamatsch | Jan. 28, 1936 |
| 2,141,627 | Street | Dec. 27, 1938 |